(12) United States Patent
Ghouse

(10) Patent No.: US 10,428,787 B2
(45) Date of Patent: Oct. 1, 2019

(54) FREE FLOATING WAVE ENERGY CONVERTER HAVING VARIABLE BUOYANCY FLEXIBLE PIPE AND ENHANCED CAPTURE WIDTH

(71) Applicant: Syed Mohammed Ghouse, Andhra Pradesh (IN)

(72) Inventor: Syed Mohammed Ghouse, Andhra Pradesh (IN)

( * ) Notice: Subject to any disclaimer, the term of this patent is extended or adjusted under 35 U.S.C. 154(b) by 21 days.

(21) Appl. No.: 15/325,457

(22) PCT Filed: Jul. 13, 2015

(86) PCT No.: PCT/IN2015/000282
§ 371 (c)(1),
(2) Date: Jan. 11, 2017

(87) PCT Pub. No.: WO2016/009447
PCT Pub. Date: Jan. 21, 2016

(65) Prior Publication Data
US 2017/0159636 A1    Jun. 8, 2017

(30) Foreign Application Priority Data
Jul. 14, 2014   (IN) ........................ 3458/CHE/2014

(51) Int. Cl.
*F03B 13/14*    (2006.01)
*F03B 13/18*    (2006.01)
(Continued)

(52) U.S. Cl.
CPC .......... *F03B 13/147* (2013.01); *F03B 13/188* (2013.01); *F03B 13/1815* (2013.01);
(Continued)

(58) Field of Classification Search
CPC .... F03B 13/147; F03B 13/1815; F03B 13/24; F03B 13/22; F05B 2250/184; F05B 2240/93; F05B 2240/914; F05B 2270/18
(Continued)

(56) References Cited

U.S. PATENT DOCUMENTS 7,823,380 B2 * 11/2010 Ghouse ................. F03B 13/147
60/496
9,074,577 B2 *  7/2015 Dehlsen ................. F03B 13/18
(Continued)

FOREIGN PATENT DOCUMENTS

DE    102011080120 A1    1/2013
GB         2475049 A      5/2011
SU         1129407 A     12/1984

*Primary Examiner* — Hoang M Nguyen
(74) *Attorney, Agent, or Firm* — William J. Clemens; Shumaker, Loop & Kendrick, LLP

(57) ABSTRACT

A free floating wave energy converter includes at least one flexible pipe, adapted to float at a surface of a body of water, having an inlet end for receiving alternating slugs of water and air when the pipe is moored facing at an angle to a wave direction in the body of water and having an outlet end in fluid communication with a power takeoff and other devices, a plurality of supports attached to the pipe at spaced apart locations, each of the supports extending traverse to a longitudinal axis of the pipe and outwardly in opposite directions and at least two inflatable tubes attached to the supports on opposite sides of the pipe extending longitudinally substantially parallel to the longitudinal axis of the pipe, wherein the pipe is raised and lowered relative to the surface of the water by respectively inflating and deflating the tubes with a gas.

19 Claims, 2 Drawing Sheets

(51) Int. Cl.
*F03B 13/24* (2006.01)
*F03B 13/22* (2006.01)

(52) U.S. Cl.
CPC .............. *F03B 13/22* (2013.01); *F03B 13/24* (2013.01); *F05B 2240/914* (2013.01); *F05B 2240/93* (2013.01); *F05B 2250/184* (2013.01); *F05B 2270/18* (2013.01); *Y02E 10/38* (2013.01)

(58) Field of Classification Search
USPC .............................. 60/495–504; 290/42, 53
See application file for complete search history.

(56) References Cited

U.S. PATENT DOCUMENTS

| | | | | |
|---|---|---|---|---|
| 2003/0184096 | A1* | 10/2003 | Newman | ................ F03B 13/24 290/54 |
| 2008/0229745 | A1 | 9/2008 | Ghouse | |
| 2012/0119510 | A1* | 5/2012 | Herzen | .................... F03D 9/17 290/1 C |
| 2014/0157767 | A1 | 6/2014 | Ghouse | |

\* cited by examiner ically in nature, and thus, the order of the steps is not necessary or critical. Certain design principles to achieve the desired results are discussed in the succeeding paragraphs.

FREE FLOATING WAVE ENERGY CONVERTER HAVING VARIABLE BUOYANCY FLEXIBLE PIPE AND ENHANCED CAPTURE WIDTH

FIELD OF THE INVENTION

The present invention relates to the field of ocean wave energy converters (WECs). More particularly the present invention is an apparatus that can be fitted to a new WEC or retrofitted to an existing WEC which provides improved variable buoyancy and enhanced capture width to the flexible pipe or plurality thereof for use with wave energy converters for extracting wave energy, thereby improving efficiency and energy conversion capacity of such WECs.

BACKGROUND OF THE INVENTION

Certain freely floating wave energy types of wave energy converters have been disclosed by the present applicant's previous patent applications and granted patents, namely the "Free Floating A Wave Energy Converter" under Indian Patent Number 239882, "Free Floating Wave Energy Converter" (FFWEC)/(US Patent # US20080229745), etc., "An Improved Free Floating Wave Energy Converter" (IFF-WEC)/[Indian Application 2511/CHE/3458], WO 2013014682 A2), PCT/IN2012/000510, EP20120753590, CA2844023A1, CN103814211A, US20140157767], and as well the US application titled, "Free Floating Wave Energy Converter With Control Devices".

The above quoted inventions essentially consist of Inlet and flexible pipe, floating on a body of water, i.e. ocean surface and adapting to wave form. The mouth of the flexible pipe is in fluid communication with an inlet and its outlet in further fluid communication with power takeoff and other devices. The inlet doses air-water slugs into the flexible pipe, which get pushed forward by transverse waves, progressively building up pressure in it—which could be used to drive conventional Hydro-generators or pump water for any other purpose.

The present invention discloses certain improvements for enhancing and controlling buoyancy of WECs employing flexible pipes to extract wave energy.

In the prior art, an Indian Application No. 2511/CHE/2011, describes the use of inflatable tubes 1300, 1302, wherein FIG. 13B shows an embodiment having certain means and methods for preventing the flexible pipe from sagging or sinking in a body of water.

The arrangement was also meant to let a segment of the flexible pipe 204 to go below a wave trough, up to a controlled depth, thereby increasing the amplitude or the effective wave height of the flexible pipe 204, as compared with the wave height of the body of water. Consequently, the wave energy absorption capacity of the flexible pipe 204 would increase, proportional with the effective wave height. To expose the flexible pipe to a larger wave front, the flexible pipe could be oriented at an angle to the oncoming waves.

Reference is also made to FIG. 1 of the India Patent Application 2511/CHE/2011 and the corresponding explanation therein, in which the pressure head created by the flexible pipe 204 is shown as the sum total of the effective wave heights, less frictional and other losses.

However, it would be apparent to one skilled in the art that, to create a pressure head in actual conditions, several other factors would also be involved, such as the force required for pushing the water slugs forward, at certain velocity, friction and rate of discharge against a pressure head. In addition to these forces there will also be certain frictional losses, when the flexible pipe goes below water surface, due to water friction on the exterior surface of the flexible pipe.

As such, the effective width or capture width of the air segment of flexible pipe 204 and inflatable tube 1300 1302 might not be sufficient to prevent the arrangement from sagging or sinking below wave crests, particularly when the pressure differential (effective wave height) is increased.

Furthermore, details of attaching the inflatable tubes 1300 1302 to the flexible pipe 204 and the added advantages that would accrue from the arrangement were not discussed in the previous invention application.

The present invention discloses details of an embodiment having certain improvements, additional features and advantages.

SUMMARY OF THE INVENTION

The objectives of the invention are, to enhance energy extraction capacity of freely floating wave energy converters employing flexible pipe for extracting wave energy, by increasing the capture width, effective wave height or pressure differential of water segments and restrain sagging of the flexible pipe.

BRIEF DESCRIPTION OF THE DRAWINGS

The above and other advantages of the present invention would become readily apparent from the following detailed description of preferred embodiments when considered in the light of the accompanying drawings in which.

DETAILED DESCRIPTION OF THE INVENTION

The description and appended drawing describe and illustrate various exemplary embodiments of the invention to make and use the invention, and are not intended to limit the scope of the invention in any manner. In respect of the methods disclosed, the steps presented are exemplary in nature, and thus, the order of the steps is not necessary or critical. Certain design principles to achieve the desired results are discussed in the succeeding paragraphs.

FIG. 1(a) depicts waves "Wd" moving from the left to the right hand side of the page. A flexible pipe 204 floating in phase with waves 1100. An inlet doses slugs of air 1012 and water 1011 are into the mouth of the flexible pipe 204 or plurality thereof, (not shown in the figure), wherein no energy is being extracted, shown as an empty overhead tank 1120, with no water in it or "zero" pressure head ($PH_0$) and frictional loss has not been considered.

In this case, the flexible pipe 204 follows the waves 1100, while the Center of Buoyancy "B" and Center of Gravity "G" and the air and water slug 1102/1101 remain at the center of the respective crests and troughs. The buoyant force ($F_b$) and the weight (W), act through Center of Buoyancy (B) and C of G (G) of each wave. However, the trough portions of the flexible pipe go slightly below the wave troughs, due to the weight of water in them. The amplitude $a_p$ of the flexible pipe 204 and the wave height "H" are nearly the same.

Figure 1:
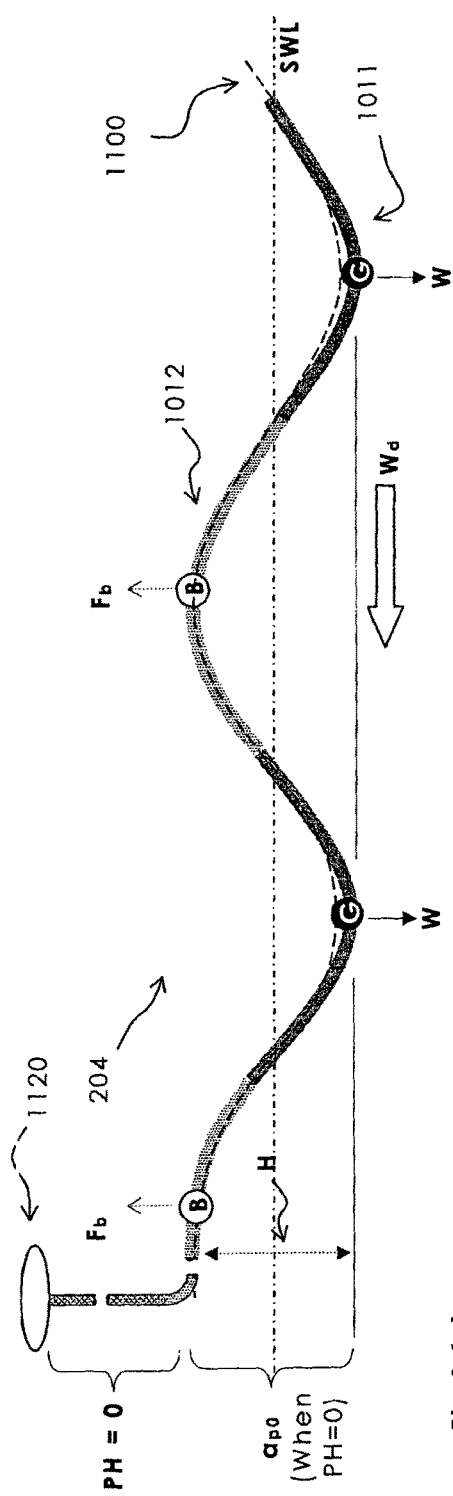
FIG. 1 (a) depicts flexible pipe with air and water slugs, with no pressure head and 1 (b) depicts a pressure head, causing "Phase Shift" and loss in wave height.
Figure 1:
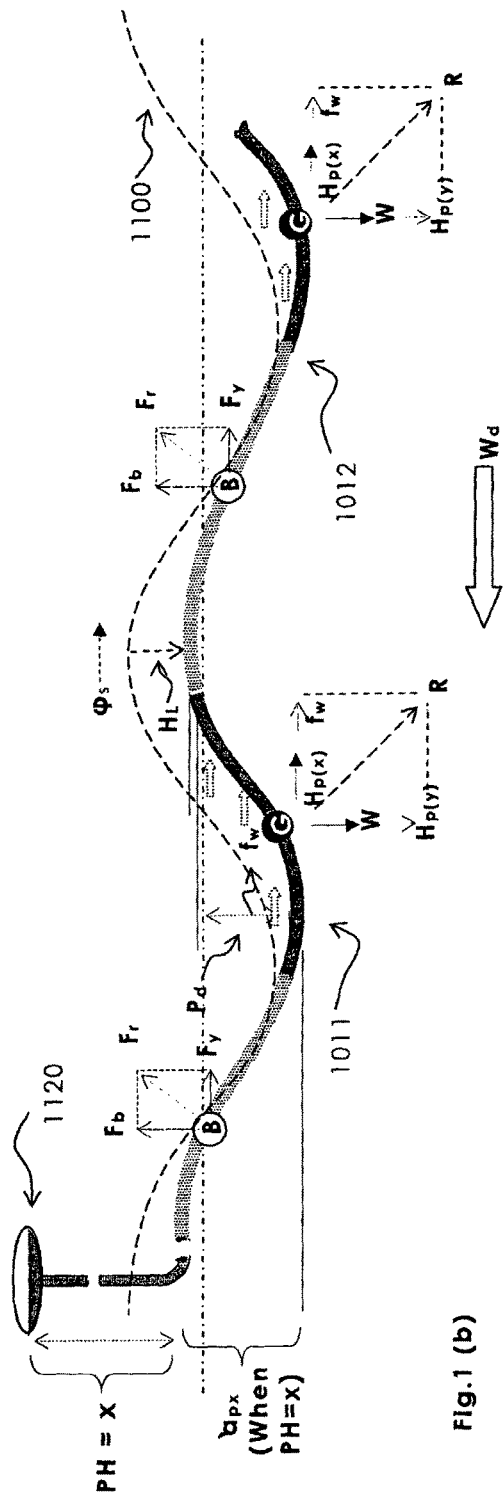

FIG. 1 (b), on the other hand, shows a flexible pipe floating on water surface and an inlet doses slugs of air 1011 and water 1012 are fed into the mouth of the flexible pipe 204 (not shown in the figure) The flexible pipe is extracting wave energy and thereby creating a pressure head "$PH_x$", represented by an overhead tank 1120 having some water in it.

Slugs of air and water from the flexible pipe 204 are pumped, under pressure through outlet of the flexible pipe, into the tank 1120, creating pressure head $PH_x$. Pumping water, against a pressure head $PH_x$, at a certain rate and mass flow, together with fluid friction, creates a backpressure $H_{p(x)}$ which acts through G of each trough pushing the flexible pipe 204 back against wave motion. The forces could be resolved into horizontal $H_{p(x)}$ and vertically downwards $H_{p(y)}$ components. In addition to this, the weight of a water slug "W" also acts downwards in the vertical plane.

Furthermore, the portion of the flexible pipe 204, which goes under water, creates drag/friction "$f_w$" from the body of water outside, as the waves move forward, following along the flexible pipe 204.

The total horizontal and vertical components at G can be resolved as a resultant "R".

Besides these, a buoyant force "$F_b$" acts vertically upwards, through the Center of Buoyancy "B". A horizontal component $F_y$ opposes forward motion of the flexible pipe 204, while the vertical component provides lifting force $F_x$.

To balance the aforementioned forces, water slugs 1011 get pushed backwards and tend to ride up the crests of the advancing waves, while the air segments 1012 shift behind and goes below the wave crests. The Center of Gravity "G" and buoyancy "B" too lag.

This causes the flexible pipe to 204 to exert horizontal $H_{p(x)}+F_w$ and vertical $H_{p(y)}$ pressures on the surface of advancing waves 1100 in the direction a resultant vector "R", causing a phase shift "$\varphi_s$" and reduction in the amplitude $a_{px}$, of the flexible pipe 204, as compared with the wave height H, by certain wave height loss $H_L$. Consequently, the Pressure Differential "$P_d$" of the water slugs also reduces and the water slugs start sinking/sagging. Advancing waves could overrun the crests of flexible pipe, causing it to sag or sink.

Therefore, the more the pressure head, the more the phase shift, the lesser the Pressure Differential and the lesser the extractable wave energy.

This would also let water slugs flow down from one trough segment to another, causing the flexible pipe to sag, despite the additional buoyancy provided by the inflatable tube 1300 embodiments disclosed in the previous invention.

An embodiment 1330 of the present invention offers solutions for overcoming the aforementioned shortcomings.

Figures 2A, 2B, 2C:
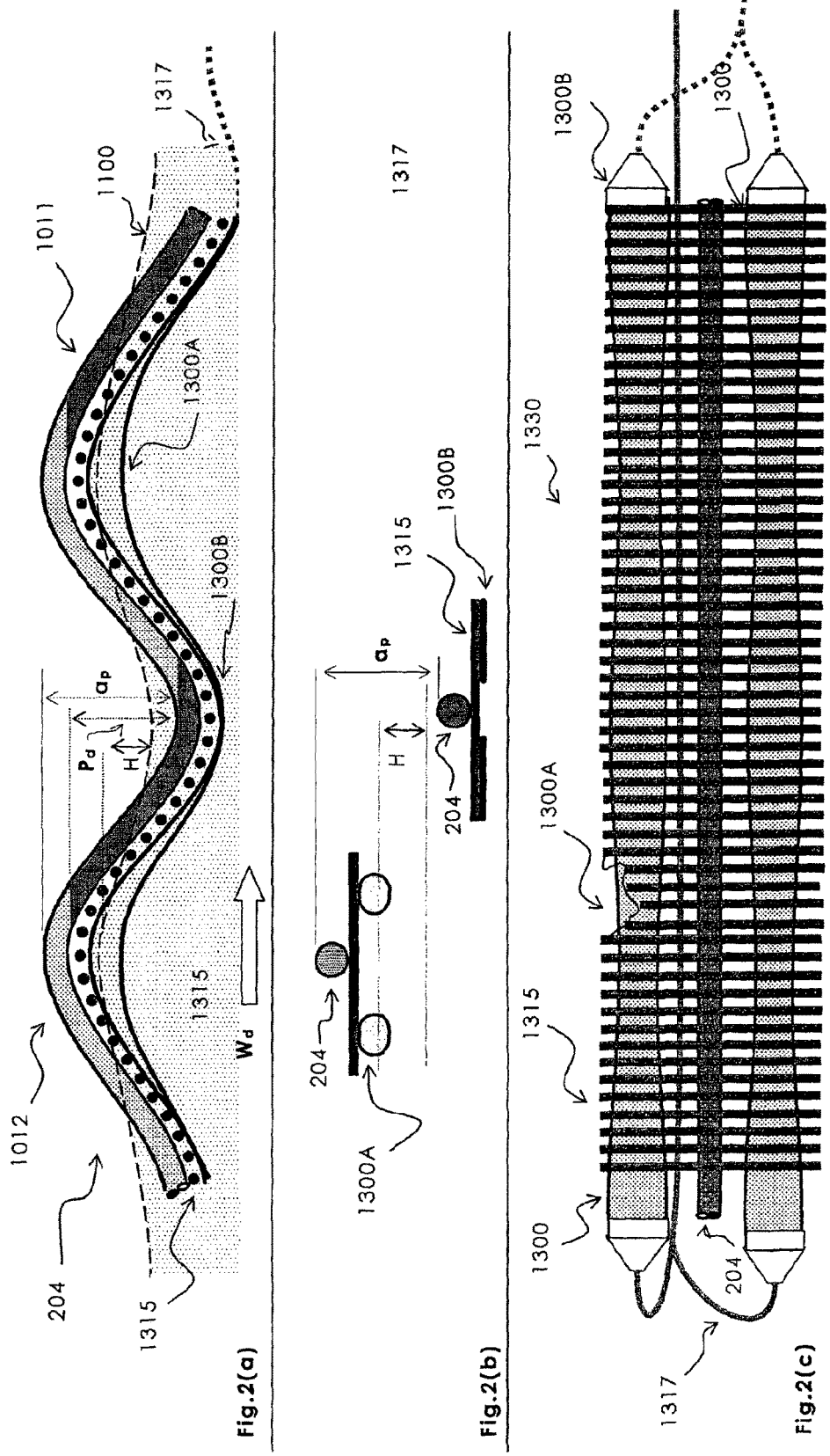
FIGS. 2 (a), 2 (b) and 2 (c) depict side, front and plan views of the preferred embodiment, respectively.

FIGS. 2(a), 2(b) and 2(c) show flexible pipe 204, or plurality thereof, suitably moored, oriented facing at an angle to the waves, floating on a body of water, i.e. ocean surface, and adapting to the wave form.

Wherein, the mouth of the flexible pipe 204 is in fluid communication with an inlet and its outlet being in further fluid communication with power takeoff and other devices, which are not shown in the present figures.

Wherein, the inlet doses air-water slugs 1012-1011 into the flexible pipe, which get pushed forward by transverse waves, progressively building up pressure in it, which could be used to drive conventional Hydro-generators or pump water for any other purpose.

Wherein, on an exterior of the flexible pipe 204 or plurality thereof, a plurality of horizontal supports 1315 are attached all along the length of the flexible pipe 204.

Wherein, the horizontal supports 1315 extend equally outwards on either side and are spaced evenly all along the length of a flexible pipe 204.

Wherein, the horizontal supports 1315 are of suitable span.

Wherein, the horizontal supports 1315 are evenly and suitably spaced.

The horizontal supports 1315 could be beams, ribs, and the like, preferably made of non-corrosive and light weight materials, such as composites, having enough tensile strength to withstand continuous load fluctuations, such as latticed constructions, of the desired lengths and profile.

Wherein, onto the horizontal supports 1315 at least two inflatable tubes 1300 attached along the length of flexible pipe 204 or plurality thereof.

Wherein, the inflatable tubes 1300 are generally arranged substantially parallel to the flexible pipe 204.

Wherein, inflatable tubes 1300 could be attached on an upper, lower or both sides of the horizontal supports 1315.

Wherein, inflatable tubes 1300 are preferably made of polymeric material or elastic rubber and the like is selectively inflated and deflated for varying its buoyancy.

Wherein, inflatable tubes 1300 are selectively inflated and deflated for varying their buoyancy.

Wherein, inflatable tubes 1300 can be of smaller lengths and suitably interconnected in fluid communication with each other in series.

Wherein, the openings at the fore and aft ends of the inflatable tubes 1300 are in fluid communication with the pressure source, through pneumatic hoses 1317, such a blower pump or the pressure chamber 208, compressor, with pressure regulators, controls, micro-processor, etc., which are not shown in the present figures.

By increasing the number and/or diameter of the inflatable tubes 1300 and span of the horizontal supports 1315, the buoyancy and the capture width of the flexible pipe could be proportionately increased.

When the inflatable tubes 1300 are fully pressurized, the buoyancy along its entire length would be high enough to keep flexible pipe 204 always floating above water, even if it is filled completely with water.

When the inflatable tubes 1300 are depleted, and the flexible pipe or plurality thereof are mostly filled with water, there would be no buoyancy enhancement. Consequently, the flexible pipe and the attached device 1330 could be made to submerge, particularly during storms. By pumping air back into the inflatable tubes 1300, the device could be resurfaced and resume normal operations.

As the pressure in the inflatable tube 1300 is reduced to an extent, the trough segments 1300B would start sinking due to the combined weight of water slugs, flexible pipe and the attached device 1330. Consequently air from the trough segments 1300B would be squeezed out and get pushed into the crest segments of the inflatable tubes 1300A, further increasing the buoyancy thereat.

It can be seen that, the crest of the inflatable tube can be made to remain always above wave crests, while its trough segment below troughs.

By regulating the volume of air in the inflatable tube 1300, the amplitude $a_p$ of the inflatable tubes and flexible pipe 204 or plurality thereof arrangement 1330, as well as the pressure differential $p_d$ can be varied to a substantial extent, as compared with the corresponding wave height H of a wave.

Further, as a trough segment 1300B of an inflatable tube sinks, the water pressure acting on its exterior surface rises with depth, thereby progressively constricting/sealing the passage within 1300B, which would impede/prevent air from flowing freely between its crests segments.

Consequently, the crest segments of the inflatable tubes 1300A would always remain above the crests of the waves, i.e. a phase lock would be formed, thereby preventing the flexible pipe from going below the wave crests; which would otherwise lead to sagging.

The air inside the inflatable/deflatable tubes 1300A/1300B gets pushed forward along with the waves, as they progress from front to rear end of the tubes and is looped through the pneumatic hoses 1317, as discussed above.

Since there will be variation in wave parameters, wave heights and lengths will vary, warranting exchange of air and water slugs between segments. When this happens, difference of air pressure between the effected segments of inflatable pipe 1300 would exceed the sealing limits of the squeezed portions of the inflatable tube 1300B, thereby permitting air to get transferred between segments.

Thus, the objectives of the present invention could be achieved by adopting the means and methods disclosed in the preceding paragraphs.

Various other permutations and combinations of the same principle of operation and arrangements are also possible, but not mentioned herein.

Numerous characteristics and advantages of the invention covered by this document will be set forth in the foregoing description. It will be understood, however, that this disclosure is, in many respects, only illustrative.

Changes may be made in details, particularly in matters of shape, size, and arrangement of parts without exceeding the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A free floating wave energy converter including at least one flexible pipe adapted to float at a surface of a body of water, the at least one flexible pipe having an inlet end for receiving alternating slugs of water and air when the at least one flexible pipe is moored facing at an angle to a wave direction in the body of water and having an outlet end in fluid communication with power takeoff and other devices, comprising:
    a plurality of horizontal supports attached to the at least one flexible pipe at spaced apart locations, each of the horizontal supports extending horizontally traverse to a longitudinal axis of the at least one flexible pipe and horizontally outwardly in opposite directions from the at least one flexible pipe; and
    at least two inflatable tubes attached to the horizontal supports on opposite sides of the at least one flexible pipe, each of the inflatable tubes extending longitudinally substantially parallel to the longitudinal axis of the at least one flexible pipe, wherein the at least one flexible pipe is raised and lowered relative to the surface of the body of water by respectively inflating and deflating the at least two inflatable tubes with a gas.

2. The converter according to claim 1 wherein the gas is air.

3. The converter according to claim 1 wherein the two inflatable tubes attached to the horizontal supports on opposite sides are selectively inflatable and deflatable.

4. The converter according to claim 1 including hoses in fluid communication with the at least two inflatable tubes for connecting the tubes to a source of the gas.

5. The converter according to claim 1 wherein the horizontal supports are evenly spaced along the longitudinal axis of the at least one flexible pipe.

6. The converter according to claim 1 wherein the at least two inflatable tubes when inflated maintain the at least one flexible pipe above the surface of the body of water.

7. The converter according to claim 1 wherein the at least one flexible pipe can be submerged below the surface of the body of water when the at least two inflatable tubes are deflated, while water is introduced into the at least one flexible pipe.

8. The converter according to claim 1 wherein crest segments of the at least one flexible pipe can be maintained above the surface of the body of water and trough segments of the least one flexible pipe can be submerged below the surface of the body of water when the at least two inflatable tubes are partially inflated.

9. A free floating wave energy converter including at least one flexible pipe adapted to float at a surface of a body of water, the at least one flexible pipe having an inlet end for receiving alternating slugs of water and air when the at least one flexible pipe is moored facing at an angle to a wave direction in the body of water and having an outlet end in fluid communication with power takeoff and other devices, comprising:
    a plurality of horizontal supports attached to the at least one flexible pipe at spaced apart locations, wherein each of the horizontal supports extends horizontally traverse to a longitudinal axis of the at least one flexible pipe and horizontally outwardly in opposite directions from the at least one flexible pipe.

10. The free floating wave energy converter according to claim 9 wherein at least two inflatable tubes are attached to the horizontal supports on opposite sides of the at least one flexible pipe.

11. The free floating wave energy converter according to claim 10 wherein each of the inflatable tubes extends longitudinally substantially parallel to the longitudinal axis of the at least one flexible pipe.

12. The free floating wave energy converter according to claim 11 wherein the at least one flexible pipe is raised and lowered relative to the surface of the body of water by respectively inflating and deflating the at least two inflatable tubes with a gas.

13. The free floating wave energy converter according to claim 12 wherein the gas is air.

14. The free floating wave energy converter according to claim 10 wherein the at least two inflatable tubes attached to the horizontal supports on opposite sides are selectively inflatable and deflatable.

15. The free floating wave energy converter according to claim 10 including hoses in fluid communication with the at least two inflatable tubes for connected the tubes to a source of gas.

16. The free floating wave energy converter according to claim 10 wherein the horizontal supports are evenly spaced along a longitudinal axis of the at least one flexible pipe.

17. The free floating wave energy converter according to claim 10 wherein the at least two inflatable tubes when inflated maintain the at least one flexible pipe above the surface of the body of water.

18. The free floating wave energy converter according to claim 10 wherein the at least one flexible pipe can be submerged below the surface of the body of water when the at least two inflatable tubes are deflated while water is introduced into the at least one flexible pipe.

19. The free floating wave energy converter according to claim 10 wherein crest segments of the at least one flexible pipe can be maintained above the surface of the body of water and trough segments of the least one flexible pipe can be submerged below the surface of the body of water when the at least two inflatable tubes are partially inflated.

* * * * *